US012688076B2

(12) United States Patent
Sareen et al.

(10) Patent No.: US 12,688,076 B2
(45) Date of Patent: Jul. 21, 2026

(54) AUTOMATIC DETECTION OF DEPLOYMENT ENVIRONMENT AND CONFIGURATION OF PRIVATE CLOUDS

(71) Applicant: Lenovo (Singapore) Pte. Ltd., Singapore (SG)

(72) Inventors: Shyam Sareen, Cary, NC (US); Rod D Waltermann, Rougemont, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 450 days.

(21) Appl. No.: 18/453,938

(22) Filed: Aug. 22, 2023

(65) Prior Publication Data

US 2025/0068484 A1     Feb. 27, 2025

(51) Int. Cl.
*G06F 9/50* (2006.01)
*G06F 9/455* (2018.01)

(52) U.S. Cl.
CPC ........ G06F 9/5077 (2013.01); G06F 9/45558 (2013.01); *G06F 2009/4557* (2013.01)

(58) Field of Classification Search
CPC ................................................... G06F 9/5077
USPC ............................................................ 718/1
See application file for complete search history.

(56) References Cited

U.S. PATENT DOCUMENTS 7,769,720 B2 *   8/2010   Armington   ........... G06F 9/4856
                                                                   707/654
10,901,768 B1 *   1/2021   Mandadi   ............. H04L 41/0897

* cited by examiner

*Primary Examiner* — Charlie Sun
(74) *Attorney, Agent, or Firm* — Schwegman Lundberg & Woessner, P.A.

(57) ABSTRACT

Machine learning algorithms are trained using implementation scripts. These machine learning algorithms are trained using different infrastructures as a service (IaaS) and platforms as a service (PaaS). The deployment environment of computer applications on a deployed IaaS or a deployed PaaS is detected. Automated computer application scripts that were used to deploy the computer applications on the deployed IaaS or the deployed PaaS are provided to the trained machine learning algorithms. The output from the trained machine learning algorithms includes automation scripts and procedures to port the computer applications on the deployed IaaS or the deployed PaaS to a new IaaS or a new PaaS. The automation scripts generated by the machine learning algorithms are provided to platform tools to create and configure the new IaaS or the new PaaS. The computer applications are ported to the new IaaS or the new PaaS using the platform tools and the procedures.

20 Claims, 4 Drawing Sheets

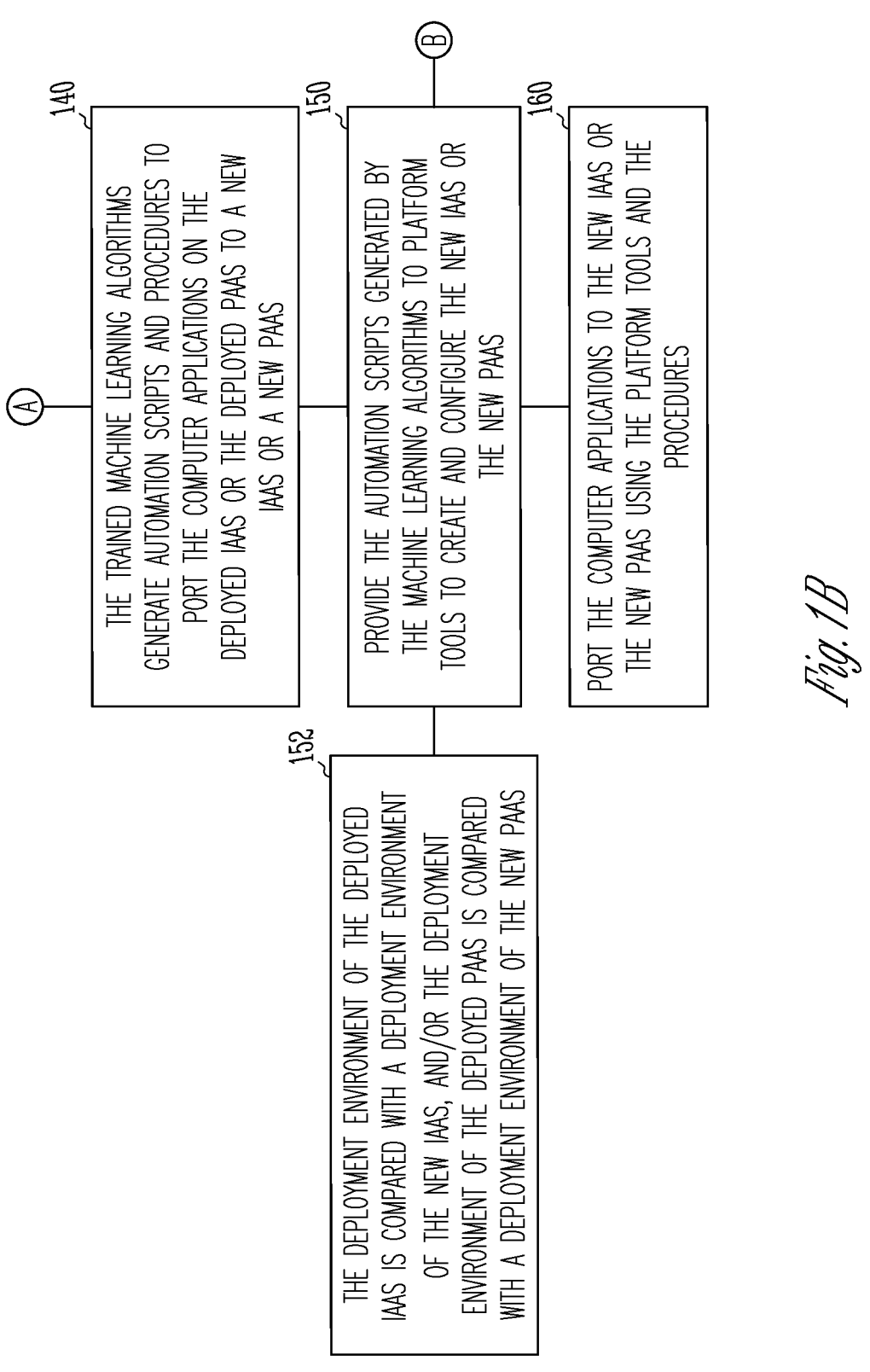

THE TRAINED MACHINE LEARNING ALGORITHMS GENERATE AUTOMATION SCRIPTS AND PROCEDURES TO PORT THE COMPUTER APPLICATIONS ON THE DEPLOYED IAAS OR THE DEPLOYED PAAS TO A NEW IAAS OR A NEW PAAS
140

PROVIDE THE AUTOMATION SCRIPTS GENERATED BY THE MACHINE LEARNING ALGORITHMS TO PLATFORM TOOLS TO CREATE AND CONFIGURE THE NEW IAAS OR THE NEW PAAS
150

PORT THE COMPUTER APPLICATIONS TO THE NEW IAAS OR THE NEW PAAS USING THE PLATFORM TOOLS AND THE PROCEDURES
160

THE DEPLOYMENT ENVIRONMENT OF THE DEPLOYED IAAS IS COMPARED WITH A DEPLOYMENT ENVIRONMENT OF THE NEW IAAS, AND/OR THE DEPLOYMENT ENVIRONMENT OF THE DEPLOYED PAAS IS COMPARED WITH A DEPLOYMENT ENVIRONMENT OF THE NEW PAAS
152

Fig. 1B

AUTOMATIC DETECTION OF DEPLOYMENT ENVIRONMENT AND CONFIGURATION OF PRIVATE CLOUDS

TECHNICAL FIELD

Embodiments described herein generally relate to the automatic detection of deployment environments for computer applications, the configuration of private clouds for those computer applications, and the scaling of those private clouds for environment capabilities.

BACKGROUND

With the recent shift to employees working from home, and indeed, working from anywhere in the business world, the requirement for hybrid cloud growth results in more businesses wanting to run their computer applications on private networks. There are many options when it comes to private networks or private clouds, both Infrastructures as a Service (IaaS) and Platforms as a Service (PaaS). For example, for IaaS, there exist Amazon Web Services (AWS), Azure, Google Cloud, VMWARE, Open Stack and Linux clusters. All these deployment platforms use methods, services and features for deploying a computer application or workload. For example, AWS provides a relational database service (RDS) and/or S3 object storage, but RDS or S3 object storage are not available on Azure or VMWARE.

In connection with this, while cloud adoption is advancing at a rapid pace, deployment complexity is also proportionally growing, and this causes major hurdles for quickly adapting private workloads in different IaaS and PaaS environments. For the IaaS or PasS that is eventually selected will ultimately drive what an entity owns and manages in the environment, as well as the workload specifications that that environment can handle. To identify a private workload deployment model that helps businesses overcome their current challenges, there is a need to determine which option best suites a business's needs regarding both control and location of the environment in a time efficient manner. Specifically, current methods of private workload deployment are extremely task and solution specific to any particular IaaS or PaaS platform. For private cloud deployments, there is a need for subject matter experts in computing, storage, and networking automation to ensure that private workloads meet the solution's needs when moving from one IaaS or PaaS platform to another.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings.

FIGS. 1A, 1B and 1C are a block diagram of operations and features of a system for automatically detecting a deployment environment of computer applications and configuring private clouds for those computer applications.

DETAILED DESCRIPTION

Embodiments of the present disclosure provide easy and efficient methods of deploying private workloads, i.e., computer applications, on any Infrastructure as a Service (IaaS), Platform as a Service (PaaS), and/or Software as a Service (SaaS). The embodiments not only determine the specific infrastructure and features of both a current deployment environment and potential new deployment environments, but also set parameters for accessing new deployment environments, establish ownership of the new deployment environments, and determine how much space is available on new deployment environments. Embodiments help to easily and seamlessly deploy private workloads on different IaaS and/or PaaS environments. Embodiments also solve private deployment issues by helping entities determine if deployment is possible on existing IaaS and/or PaaS hardware in a few hours rather than a few months.

A goal of the embodiments is the creation of an artificial intelligence-based engine that understands different IaaS and PaaS platforms and solution requirements to provide automation scripts and procedures to seamlessly port workloads from one IaaS or PaaS platform to another IaaS or PaaS platform in less time and with a better return on investment. An embodiment provides a trained AI engine along with software and tools to generate a set of curated rules to detect the capabilities of a current IaaS or PaaS platform and then auto-generate platform-based configuration script files, and further provides steps to migrate the application/solution from the current IaaS/PaaS platform to a new IaaS/PaaS platform.

This is accomplished by comparative analysis of the two platforms with the goal of running the existing solution on the new platform, with a difference generated between the two platforms, and using tools to generate the scripts to produce the desired outcome. This is then compared against the IaaS/PaaS generated configurations to ensure that the steps will satisfy the intended needs and purposes of the private workload.

If the requirements are satisfied, then the new intended IaaS/PaaS environment is created. The automated embodiment uses the typical technologies that are used to create an IaaS/PaaS platform, such as Terraform, Packers and Ansible scripts for configuration of the IaaS layers. Thereafter, Kubespray and Ansible can be used to create the PaaS layer for Kubernetes based solutions. The intended workload or application functionality is driven by Helms charts on top of the PaaS.

Figure 1A:
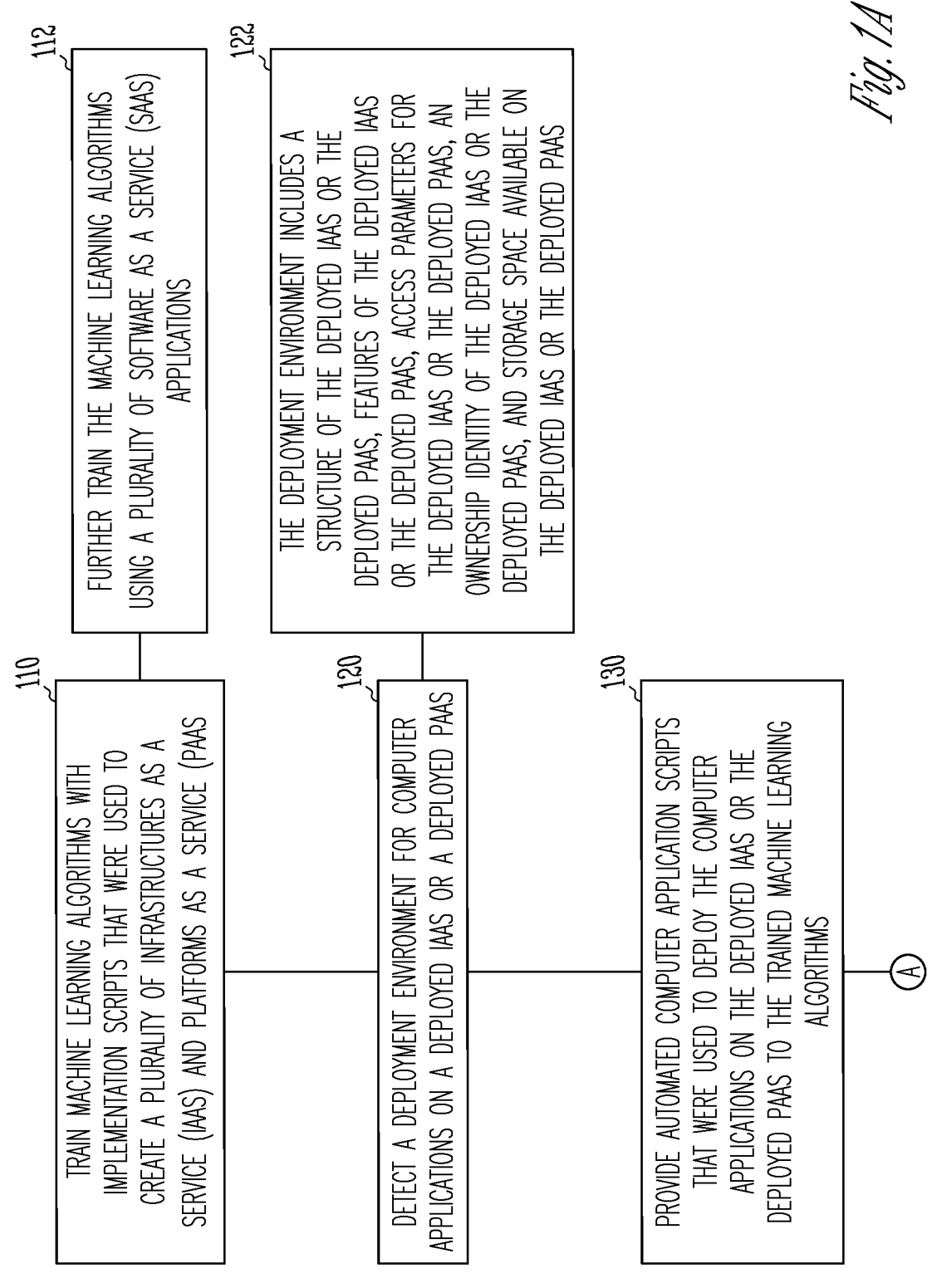
Figure 1C:
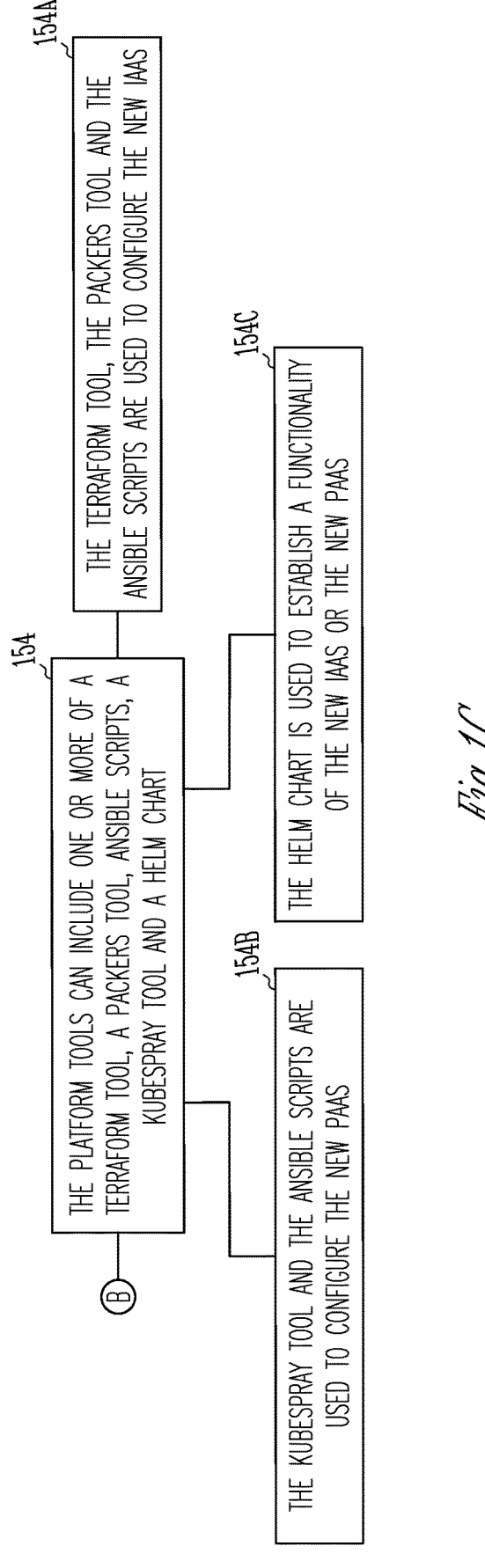

FIGS. 1A, 1B and 1C are a block diagram illustrating example embodiments of a system and process for automatically detecting a deployment environment of computer applications and configuring private clouds for those computer applications. FIGS. 1A, 1B and 1C include a number of operation and feature blocks 110-160. Though arranged substantially serially in the example of FIGS. 1A, 1B and 1C, other examples may reorder the blocks, omit one or more blocks, and/or execute two or more blocks in parallel using multiple processors or a single processor organized as two or more virtual machines or sub-processors.

Referring now specifically to FIGS. 1A, 1B and 1C, at 110, machine learning algorithms are trained with implementation scripts that were used to create a plurality of infrastructures as a service (IaaS) and platforms as a service (PaaS). As indicated at 112, the machine learning algorithms can be further trained using a plurality of Software as a Service (SaaS) applications.

At 120, a deployment environment for computer applications on a deployed IaaS or a deployed PaaS is determined. As indicated at 122, the deployment environment can include a structure of the deployed IaaS or the deployed PaaS, features of the deployed IaaS or the deployed PaaS, access parameters for the deployed IaaS or the deployed PaaS, an ownership identity of the deployed IaaS or the deployed PaaS, and storage space available on the deployed IaaS or the deployed PaaS.

At 130, automated computer application scripts that were used to deploy the computer applications on the deployed IaaS or the deployed PaaS are provided to the trained machine learning algorithms.

At 140, the trained machine learning algorithms generate output. The output includes automation scripts and procedures to port the computer applications on the deployed IaaS or the deployed PaaS to a new IaaS or a new PaaS.

At 150, the automation scripts generated by the machine learning algorithms are provided to platform tools, which are used to create and configure the new IaaS or the new PaaS. At 152, the deployment environment of the deployed IaaS is compared with a deployment environment of the new IaaS, and/or the deployment environment of the deployed PaaS is compared with a deployment environment of the new PaaS. These comparisons verify that the new IaaS or the new PaaS satisfies workload requirements of the computer applications.

As indicated at 154, the platform tools can include one or more of a Terraform tool, a packer tool, Ansible scripts, a Kubespray tool and Helm charts. As known to those skilled in the art. Terraform is an open-source infrastructure-as-code software tool. Users define and provide data center infrastructure using a declarative configuration language. Terraform manages external resources (such as public cloud infrastructure, private cloud infrastructure, network appliances, SaaS and PaaS) with providers. Users can interact with Terraform providers by declaring resources or by calling data sources. Rather than using imperative commands to provision resources. Terraform uses declarative configurations to describe the desired final state. Once a user invokes Terraform on a given resource. Terraform will perform CRUD (create, read, update and delete) actions on the user's behalf to accomplish the desired state. The infrastructure as code can be written as modules, promoting reusability and maintainability. Terraform modules are designed to simplify the creation of multiple resources by grouping them logically in a single and reusable offering. This minimizes development time and reduces redundancy, making it easier for users to create complex infrastructure components without writing large amounts of code.

The packer tool compresses the software that is used to create the new IaaS or the new PaaS. The packer tool can compress the code and data into a single executable. This of course saves resources on the system. Ansible scripts are a suite of software tools that enables infrastructure as a code. The suite includes software provisioning, configuration management, and application deployment functionality.

Kubespray is used to deploy Kubernetes clusters. Kubernetes defines a set of building blocks ("primitives") that collectively provide mechanisms that deploy, maintain, and scale applications based on CPU, memory or custom metrics. Kubernetes is loosely coupled and extensible to meet different workloads. The internal components as well as extensions and containers that run on Kubernetes rely on the Kubernetes API. The platform exerts its control over compute and storage resources by defining resources as objects, which can then be managed as such. Helm and its associated charts are a package manager for Kubernetes that makes it easy to take applications and services to deploy them to a Kubernetes cluster.

More specifically, as indicated at 154A, the Terraform tool, the packers tool and the ansible scripts are used to configure the new IaaS. As indicated at 154B, the Kubespray tool and the ansible scripts are used to configure the new PaaS. As indicated at 154C, the Helm charts are used to establish a functionality of the new IaaS or the new PaaS.

At 160, the computer applications are ported to the new IaaS or the new PaaS using the platform tools and the procedures.

Figure 2:
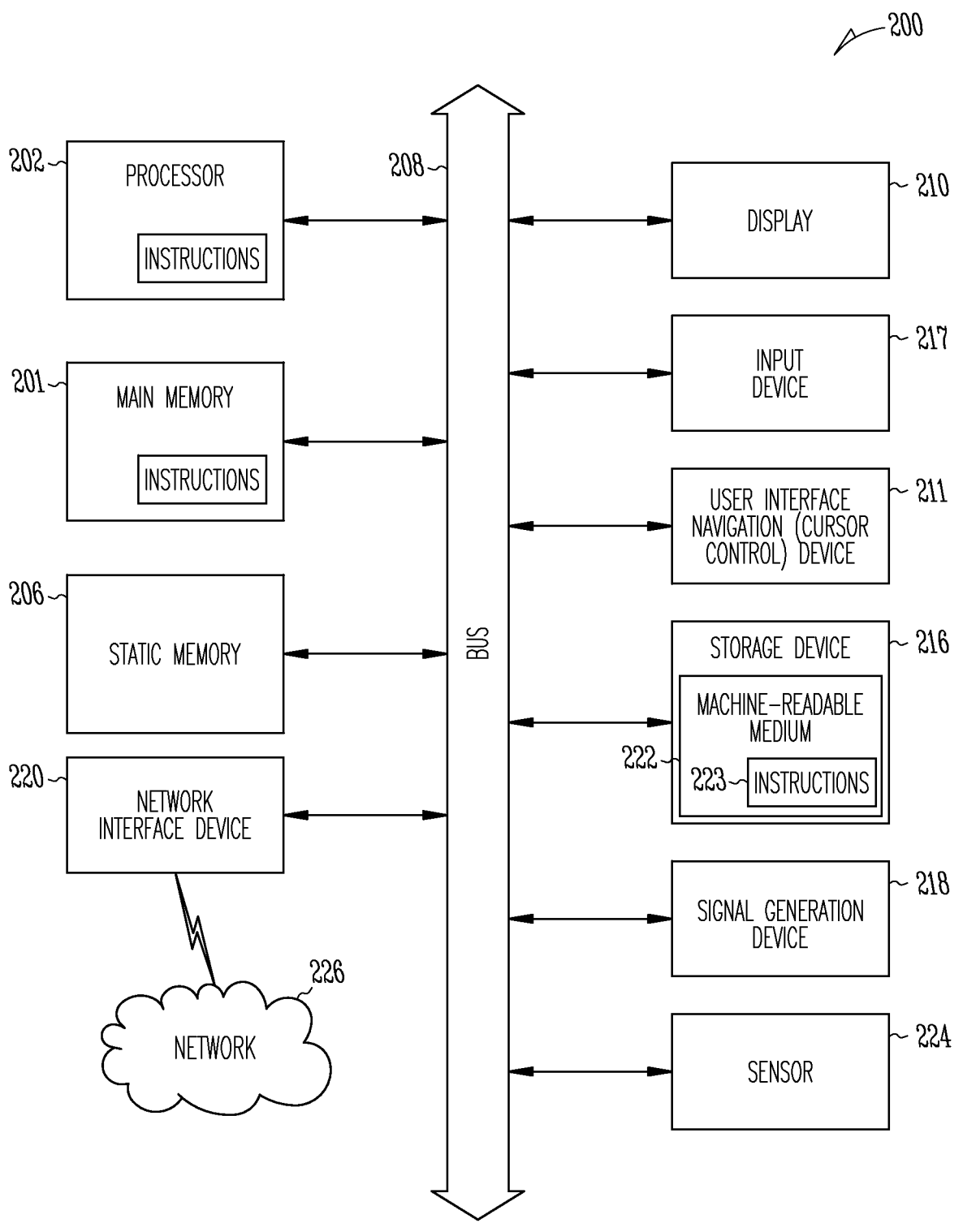
FIG. 2 is a block diagram of a computer architecture upon which one or more of the embodiments disclosed herein can execute.

FIG. 2 is a block diagram illustrating a computing and communications platform 200 in the example form of a general-purpose machine on which some or all the operations of FIGS. 1A, 1B and 1C may be carried out according to various embodiments. In certain embodiments, programming of the computing platform 200 according to one or more particular algorithms produces a special-purpose machine upon execution of that programming. In a networked deployment, the computing platform 200 may operate in the capacity of either a server or a client machine in server-client network environments, or it may act as a peer machine in peer-to-peer (or distributed) network environments.

Example computing platform 200 includes at least one processor 202 (e.g., a central processing unit (CPU), a graphics processing unit (GPU) or both, processor cores, compute nodes, etc.), a main memory 201 and a static memory 206, which communicate with each other via a link 208 (e.g., bus). The computing platform 200 may further include a video display unit 210, input devices 217 (e.g., a keyboard, camera, microphone), and a user interface (UI) navigation device 211 (e.g., mouse, touchscreen). The computing platform 200 may additionally include a storage device 216 (e.g., a drive unit), a signal generation device 218 (e.g., a speaker), a sensor 224, and a network interface device 220 coupled to a network 226.

The storage device 216 includes a non-transitory machine-readable medium 222 on which is stored one or more sets of data structures and instructions 223 (e.g., software) embodying or utilized by any one or more of the methodologies or functions described herein. The instructions 223 may also reside, completely or at least partially, within the main memory 201, static memory 206, and/or within the processor 202 during execution thereof by the computing platform 200, with the main memory 201, static memory 206, and the processor 202 also constituting machine-readable media.

While the machine-readable medium 222 is illustrated in an example embodiment to be a single medium, the term "machine-readable medium" may include a single medium or multiple media (e.g., a centralized or distributed database, and/or associated caches and servers) that store the one or more instructions 223. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplated are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

EXAMPLES

Example No. 1 is a process for receiving machine learning algorithms trained using implementation scripts for a plurality of infrastructures as a service (IaaS) and platforms as a service (PaaS); detecting a deployment environment of computer applications on a deployed IaaS or a deployed PaaS; providing automated computer application scripts that were used to deploy the computer applications on the deployed IaaS or the deployed PaaS to the trained machine learning algorithms; receiving output from the trained machine learning algorithms, the output comprising automation scripts and procedures to port the computer applications on the deployed IaaS or the deployed PaaS to a new IaaS or a new PaaS; providing the automation scripts generated by the machine learning algorithms to platform tools to create and configure the new IaaS or the new PaaS; and porting the computer applications to the new IaaS or the new PaaS using the platform tools and the procedures.

Example No. 2 includes all the features of Example No. 1 and optionally includes a process wherein the deployment environment comprises a structure of the deployed IaaS or the deployed PaaS, features of the deployed IaaS or the deployed PaaS, access parameters for the deployed IaaS or the deployed PaaS, an ownership identity of the deployed IaaS or the deployed PaaS, and storage space available on the deployed IaaS or the deployed PaaS.

Example No. 3 includes all the features of Example Nos. 1-2 and optionally includes a process comprising comparing the deployment environment of the deployed IaaS with a deployment environment of the new IaaS or the deployment environment of the deployed PaaS with a deployment environment of the new PaaS to verify that the new IaaS or the new PaaS satisfies workload requirements of the computer applications.

Example No. 4 includes all the features of Example Nos. 1-3 and optionally includes a process wherein the platform tools comprise one of more of a terraform tool, a packers tool, ansible scripts, a kubespray tool and a Helm chart.

Example No. 5 includes all the features of Example Nos. 1-4 and optionally includes a process wherein the terraform tool, the packers tool and the ansible scripts are used to configure the new IaaS.

Example No. 6 includes all the features of Example Nos. 1-5 and optionally includes a process wherein the kubespray tool and the ansible scripts are used to configure the new PaaS.

Example No. 7 includes all the features of Example Nos. 1-6 and optionally includes a process comprising using the Helm chart to establish a functionality of the new IaaS or the new PaaS.

Example No. 8 includes all the features of Example Nos. 1-7 and optionally includes a process wherein the machine learning algorithms are trained using a plurality of Software as a Service (SaaS) applications.

Example No. 9 is a machine-readable medium comprising instructions that when executed by a processor execute a process comprising receiving machine learning algorithms trained using implementation scripts for a plurality of infrastructures as a service (IaaS) and platforms as a service (PaaS); detecting a deployment environment of computer applications on a deployed IaaS or a deployed PaaS; providing automated computer application scripts that were used to deploy the computer applications on the deployed IaaS or the deployed PaaS to the trained machine learning algorithms; receiving output from the trained machine learning algorithms, the output comprising automation scripts and procedures to port the computer applications on the deployed IaaS or the deployed PaaS to a new IaaS or a new PaaS; providing the automation scripts generated by the machine learning algorithms to platform tools to create and configure the new IaaS or the new PaaS; and porting the computer applications to the new IaaS or the new PaaS using the platform tools and the procedures.

Example No. 10 includes all the features of Example No. 9 and optionally includes a machine-readable medium wherein the deployment environment comprises a structure of the deployed IaaS or the deployed PaaS, features of the deployed IaaS or the deployed PaaS, access parameters for the deployed IaaS or the deployed PaaS, an ownership identity of the deployed IaaS or the deployed PaaS, and storage space available on the deployed IaaS or the deployed PaaS.

Example No. 11 includes all the features of Example Nos. 9-10 and optionally includes a machine-readable medium comprising instructions for comparing the deployment environment of the deployed IaaS with a deployment environment of the new IaaS or the deployment environment of the deployed PaaS with a deployment environment of the new PaaS to verify that the new IaaS or the new PaaS satisfies workload requirements of the computer applications.

Example No. 12 includes all the features of Example Nos. 9-11 and optionally includes a machine-readable medium wherein the platform tools comprise one of more of a terraform tool, a packers tool, ansible scripts, a kubespray tool and a Helm chart.

Example No. 13 includes all the features of Example Nos. 9-12 and optionally includes a machine-readable medium wherein the terraform tool, the packers tool and the ansible scripts are used to configure the new IaaS.

Example No. 14 includes all the features of Example Nos. 9-13 and optionally includes a machine-readable medium wherein the kubespray tool and the ansible scripts are used to configure the new PaaS.

Example No. 15 includes all the features of Example Nos. 9-14 and optionally includes a machine-readable medium comprising instructions for using the Helm chart to establish a functionality of the new IaaS or the new PaaS.

Example No. 16 includes all the features of Example Nos. 9-15 and optionally includes a machine-readable medium wherein the machine learning algorithms are trained using a plurality of Software as a Service (SaaS) applications.

Example No. 17 is a system comprising a computer processor; and a memory coupled to the computer processor; wherein the computer processor and memory are operable for receiving machine learning algorithms trained using implementation scripts for a plurality of infrastructures as a service (IaaS) and platforms as a service (PaaS); detecting a deployment environment of computer applications on a deployed IaaS or a deployed PaaS; providing automated computer application scripts that were used to deploy the computer applications on the deployed IaaS or the deployed PaaS to the trained machine learning algorithms; receiving output from the trained machine learning algorithms, the output comprising automation scripts and procedures to port the computer applications on the deployed IaaS or the deployed PaaS to a new IaaS or a new PaaS; providing the automation scripts generated by the machine learning algorithms to platform tools to create and configure the new IaaS or the new PaaS; and porting the computer applications to the new IaaS or the new PaaS using the platform tools and the procedures.

Example No. 18 includes all the features of Example No. 17 and optionally includes a system wherein the deployment environment comprises a structure of the deployed IaaS or the deployed PaaS, features of the deployed IaaS or the deployed PaaS, access parameters for the deployed IaaS or the deployed PaaS, an ownership identity of the deployed IaaS or the deployed PaaS, and storage space available on the deployed IaaS or the deployed PaaS.

Example No. 19 includes all the features of Example Nos. 17-18 and optionally includes a system wherein the computer processor and memory are operable for comparing the deployment environment of the deployed IaaS with a deployment environment of the new IaaS or the deployment environment of the deployed PaaS with a deployment environment of the new PaaS to verify that the new IaaS or the new PaaS satisfies workload requirements of the computer applications.

Example No. 20 includes all the features of Example Nos. 17-19 and optionally includes a system wherein the platform tools comprise one of more of a terraform tool, a packers tool, ansible scripts, a kubespray tool and a Helm chart.

The invention claimed is:

1. A computerized process comprising:
receiving machine learning algorithms trained using implementation scripts for a plurality of infrastructures as a service (IaaS) and platforms as a service (PaaS);
detecting a deployment environment of computer applications on a deployed IaaS or a deployed PaaS;
providing automated computer application scripts that were used to deploy the computer applications on the deployed IaaS or the deployed PaaS to the trained machine learning algorithms;
receiving output from the trained machine learning algorithms, the output comprising automation scripts and procedures to port the computer applications on the deployed IaaS or the deployed PaaS to a new IaaS or a new PaaS;
providing the automation scripts generated by the machine learning algorithms to platform tools to create and configure the new IaaS or the new PaaS; and
porting the computer applications to the new IaaS or the new PaaS using the platform tools and the procedures;
wherein the machine learning algorithms and the platform tools generate a set of curated rules, the curated rules for detecting capabilities of the deployed IaaS or the deployed PaaS, for auto-generating the automation scripts, and for the porting of the computer applications to the new IaaS or the new PaaS; and
comparing the deployed IaaS to the new IaaS or comparing the deployed PaaS to the new PaaS by executing an existing solution on the new IaaS or the new PaaS, thereby generating a difference between the deployed IaaS and the new IaaS or the deployed PaaS or the new PaaS;
using the platform tools to generate the automation scripts to produce an outcome; and
comparing the outcome against new IaaS or the new PaaS, thereby verifying that the new IaaS or the new PaaS satisfies intended needs and purposes of the computer applications.

2. The computerized process of claim 1, wherein the deployment environment comprises a structure of the deployed IaaS or the deployed PaaS, features of the deployed IaaS or the deployed PaaS, access parameters for the deployed IaaS or the deployed PaaS, an ownership identity of the deployed IaaS or the deployed PaaS, and storage space available on the deployed IaaS or the deployed PaaS.

3. The computerized process of claim 1, comprising comparing the deployment environment of the deployed IaaS with a deployment environment of the new IaaS or the deployment environment of the deployed PaaS with a deployment environment of the new PaaS to verify that the new IaaS or the new PaaS satisfies workload requirements of the computer applications.

4. The computerized process of claim 1, wherein the platform tools comprise one or more of a terraform tool, a packers tool, ansible scripts, a kubespray tool and a Helm chart.

5. The computerized process of claim 4, wherein the terraform tool, the packers tool and the ansible scripts are used to configure the new IaaS.

6. The computerized process of claim 4, wherein the kubespray tool and the ansible scripts are used to configure the new PaaS.

7. The computerized process of claim 4, comprising using the Helm chart to establish a functionality of the new IaaS or the new PaaS.

8. The computerized process of claim 1, wherein the machine learning algorithms are trained using a plurality of Software as a Service (SaaS) applications.

9. A non-transitory machine-readable medium comprising instructions that when executed by a processor execute a process comprising:

receiving machine learning algorithms trained using implementation scripts for a plurality of infrastructures as a service (IaaS) and platforms as a service (PaaS);

detecting a deployment environment of computer applications on a deployed IaaS or a deployed PaaS;

providing automated computer application scripts that were used to deploy the computer applications on the deployed IaaS or the deployed PaaS to the trained machine learning algorithms;

receiving output from the trained machine learning algorithms, the output comprising automation scripts and procedures to port the computer applications on the deployed IaaS or the deployed PaaS to a new IaaS or a new PaaS;

providing the automation scripts generated by the machine learning algorithms to platform tools to create and configure the new IaaS or the new PaaS; and porting the computer applications to the new IaaS or the new PaaS using the platform tools and the procedure:

wherein the machine learning algorithms and the platform tools generate a set of curated rules, the curated rules for detecting capabilities of the deployed IaaS or the deployed PaaS, for auto-generating the automation scripts, and for the porting of the computer applications to the new IaaS or the new PaaS; and comparing the deployed IaaS to the new IaaS or comparing the deployed PaaS to the new PaaS by executing an existing solution on the new IaaS or the new PaaS, thereby generating a difference between the deployed IaaS and the new IaaS or the deployed PaaS or the new PaaS;

using the platform tools to generate the automation scripts to produce an outcome; and comparing the outcome against new IaaS or the new PaaS, thereby verifying that the new IaaS or the new PaaS satisfies intended needs and purposes of the computer applications.

10. The non-transitory machine-readable medium of claim 9, wherein the deployment environment comprises a structure of the deployed IaaS or the deployed PaaS, features of the deployed IaaS or the deployed PaaS, access parameters for the deployed IaaS or the deployed PaaS, an ownership identity of the deployed IaaS or the deployed PaaS, and storage space available on the deployed IaaS or the deployed PaaS.

11. The non-transitory machine-readable medium of claim 9, comprising instructions for comparing the deployment environment of the deployed IaaS with a deployment environment of the new IaaS or the deployment environment of the deployed PaaS with a deployment environment of the new PaaS to verify that the new IaaS or the new PaaS satisfies workload requirements of the computer applications.

12. The non-transitory machine-readable medium of claim 9, wherein the platform tools comprise one or more of a terraform tool, a packers tool, ansible scripts, a kubespray tool and a Helm chart.

13. The non-transitory machine-readable medium of claim 12, wherein the terraform tool, the packers tool and the ansible scripts are used to configure the new IaaS.

14. The non-transitory machine-readable medium of claim 12, wherein the kubespray tool and the ansible scripts are used to configure the new PaaS.

15. The non-transitory machine-readable medium of claim 12, comprising instructions for using the Helm chart to establish a functionality of the new IaaS or the new PaaS.

16. The non-transitory machine-readable medium of claim 9, wherein the machine learning algorithms are trained using a plurality of Software as a Service (SaaS) applications.

17. A system comprising:

a computer processor; and a memory coupled to the computer processor;

wherein the computer processor and memory are operable for:

receiving machine learning algorithms trained using implementation scripts for a plurality of infrastructures as a service (IaaS) and platforms as a service (PaaS);

detecting a deployment environment of computer applications on a deployed IaaS or a deployed PaaS;

providing automated computer application scripts that were used to deploy the computer applications on the deployed IaaS or the deployed PaaS to the trained machine learning algorithms;

receiving output from the trained machine learning algorithms, the output comprising automation scripts and procedures to port the computer applications on the deployed IaaS or the deployed PaaS to a new IaaS or a new PaaS;

providing the automation scripts generated by the machine learning algorithms to platform tools to create and configure the new IaaS or the new PaaS; and porting the computer applications to the new IaaS or the new PaaS using the platform tools and the procedures;

wherein the machine learning algorithms and the platform tools generate a set of curated rules, the curated rules for detecting capabilities of the deployed IaaS or the deployed PaaS, for auto-generating the automation scripts, and for the porting of the computer applications to the new IaaS or the new PaaS; and comparing the deployed IaaS to the new IaaS or comparing the deployed PaaS to the new PaaS by executing an existing solution on the new IaaS or the new PaaS, thereby generating a difference between the deployed IaaS and the new IaaS or the deployed PaaS or the new PaaS;

using the platform tools to generate the automation scripts to produce an outcome; and comparing the outcome against new IaaS or the new PaaS, thereby verifying that the new IaaS or the new PaaS satisfies intended needs and purposes of the computer applications.

18. The system of claim 17, wherein the deployment environment comprises a structure of the deployed IaaS or the deployed PaaS, features of the deployed IaaS or the deployed PaaS, access parameters for the deployed IaaS or the deployed PaaS, an ownership identity of the deployed IaaS or the deployed PaaS, and storage space available on the deployed IaaS or the deployed PaaS.

19. The system of claim 17, wherein the computer processor and memory are operable for comparing the deployment environment of the deployed IaaS with a deployment environment of the new IaaS or the deployment environment of the deployed PaaS with a deployment environment of the new PaaS to verify that the new IaaS or the new PaaS satisfies workload requirements of the computer applications.

20. The system of claim 17, wherein the platform tools comprise one or more of a terraform tool, a packers tool, ansible scripts, a kubespray tool and a Helm chart.

\* \* \* \* \*